Feb. 13, 1940.  W. W. DAVIDSON ET AL  2,190,414
FOLDING MACHINE
Filed May 2, 1938  12 Sheets-Sheet 1

Feb. 13, 1940.  W. W. DAVIDSON ET AL  2,190,414
FOLDING MACHINE
Filed May 2, 1938   12 Sheets-Sheet 9

Inventors
William Ward Davidson
William Ward Davidson, Jr.
By Mann, Brown & Co.
Attys.

Feb. 13, 1940.　　W. W. DAVIDSON ET AL　　2,190,414
FOLDING MACHINE
Filed May 2, 1938　　12 Sheets-Sheet 10

Inventors
William Ward Davidson
By William Ward Davidson, Jr.
Mann, Brown &Co Attys.

Patented Feb. 13, 1940

2,190,414

UNITED STATES PATENT OFFICE 2,190,414

FOLDING MACHINE

William Ward Davidson, Evanston, and William Ward Davidson, Jr., Niles Center, Ill., assignors to Davidson Manufacturing Corporation, a corporation of Illinois Application May 2, 1938, Serial No. 205,570

10 Claims. (Cl. 270—62)

Folding machines are used in printing establishments, book binderies, manufacturing plants, direct mail and letter servicing concerns, and many large offices, and the folds required by these and other users vary from single folds to a complicated series of folds, some in one direction and some in another. Machines capable of making these complicated folds have in the past been large and bulky machines with their costs so high and space requirements so great that only large concerns have been able to buy them.

The present invention has for its primary object to provide a machine of greatly simplified design which can reliably perform the complicated folds required by certain users, as well as more simple folds, and can be built to sell for a price which is only a small fraction of that which the older style folders of equivalent performance (i. e. folders having the ability to make the same variety of folds) must of necessity bring because of their massiveness and complexity.

The accomplishment of this revolutionary and radical change in folding machine design and basic organization is achieved by a novel arrangement and organization of the folding units and the conveying tables with which they are associated, all of which greatly reduce their cost and space requirements to such an extent that an entirely new field is opened for sales and exploitation.

More specifically, however, one of the principal objects of the invention is to provide a machine which can produce any combination whatsoever of three parallel and/or right angle folds, and to achieve this flexibility of performance with a minimum number of folding units.

Further objects and advantages of the invention will appear as the description is read in connection with the accompanying drawings, in which.

The machine shown in Figs. 14–18 inclusive is the preferred embodiment of the invention because of the great variety of folds which it is capable of producing, but the machine shown in Figs. 1–13 inclusive also has certain distinct advantages over prior art machines. The specific disclosure of these two embodiments of the invention is made in compliance with section 4888 of the Revised Statutes, and it should be understood that the appended claims are not to be limited by the specific disclosure unless required by the prior art.

THREE-UNIT FOLDER (FIGS. 1–13 INCLUSIVE)

Figure 1:
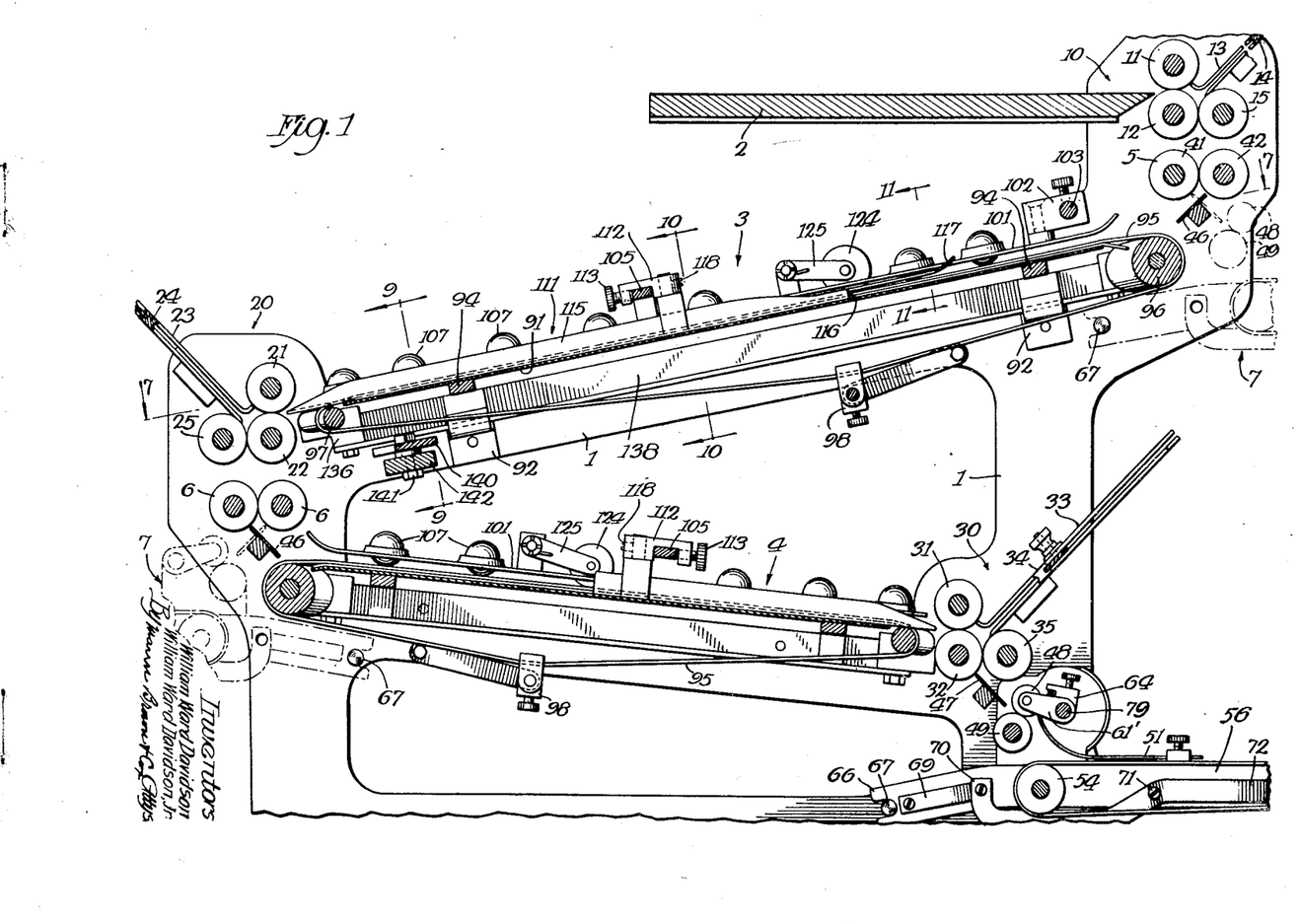
Fig. 1 is a vertical longitudinal sectional view taken through the machine approximately on the line 1—1 of Fig. 7, the stacking unit being fragmentarily shown in one position in full lines and in two alternative positions in dotted lines.
Figure 2:
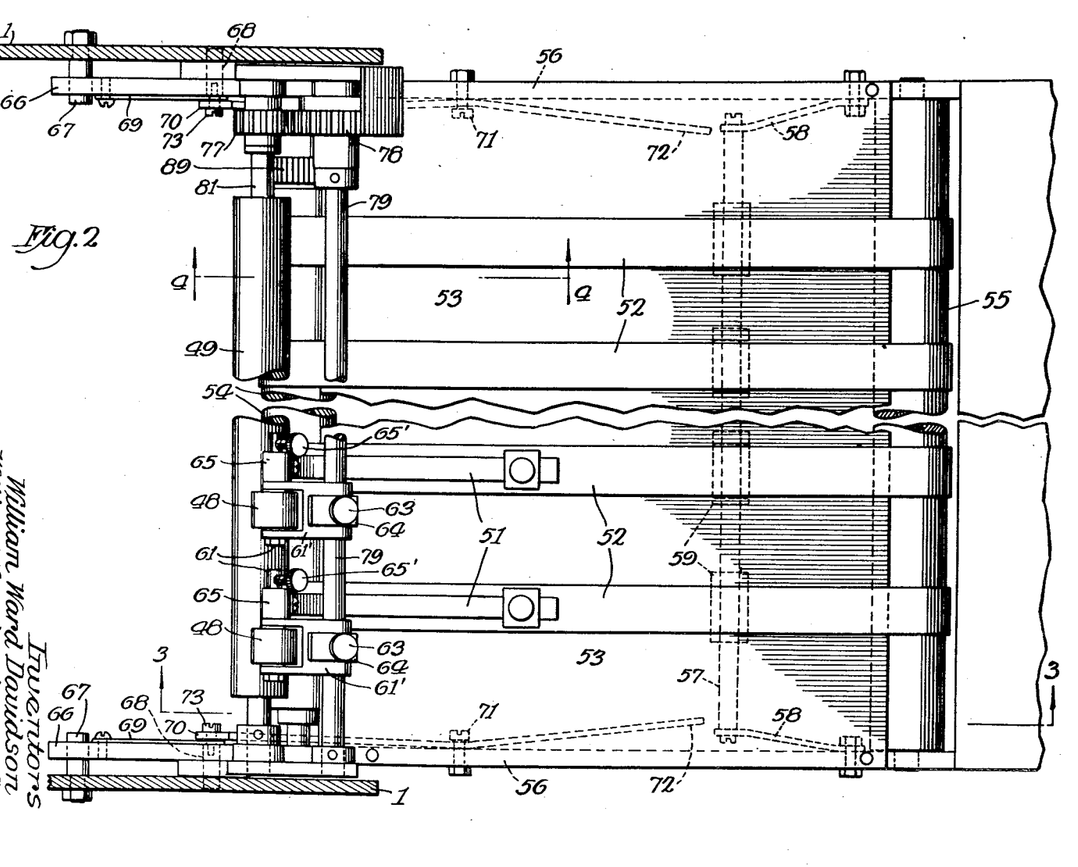
Fig. 2 is a fragmentary plan view of the stacking unit showing its mounting on the main frame.

As seen in Fig. 1, the entire folding machine may be supported by a frame 1 and, briefly stated, includes a feed table indicated more or less diagrammatically at 2, a conveying and turning table indicated as a whole by the numeral 3, a second conveying and turning table indicated as a whole by the numeral 4, with folding units 10, 20 and 30 positioned at the end of each table, scoring rolls 5 and 6 adjacent to the folding units 10 and 20, and with an ejecting and stacking unit 7 optionally positioned adjacent any folding unit to receive the folded sheet therefrom.

Folding units

Although the folding units may be of any type, that illustrated is the buckle type, and it is the same at all positions. The reference numerals begin with 11 in unit 10, 21 in unit 20, and 31 in unit 30, the last digits being the same for like parts. The paper is fed to the folding unit 10 from the table 2 either by hand or, more commonly, by an automatic feeding device. The construction of the folding units is seen best in Fig. 3, in which the folding unit is that at the third position, the feeding and folding rolls being numbered 31, 32 and 35. The rolls 31 and 32 first receive the paper and feed it into the buckle chute 33, which it enters freely until it strikes the paper stop 34 which stops the forward edge of the paper. Since the feeding action of rolls 31 and 32 continues, the paper necessarily buckles into the space between rolls 32 and 35. The buckled sheet is thus caught by these two rolls and drawn in between them to crease the buckled sheet and thus complete the fold. The position of the fold is determined by the position of the paper stop 34, which may be adjusted by loosening the clamping nuts 36. The two rolls 32 and 35 continue to draw the paper down between them, drawing it out of the buckle chute 33 and feeding it to the next unit of the machine.

In Fig. 1 the sheet passes from the corresponding rolls 12 and 15 to the scoring rolls 5, one of which may be grooved or formed of rubber to receive a blade-like member on the other. It may be observed that the scoring is not necessary before the first fold, but is usually desirable for subsequent right-angle folds to insure a smooth fold of the already folded paper. If there is to be no subsequent right-angle fold, the scoring rolls may be separated or moved to one side so as not to score.

Deflectors

Below the scoring rolls 5 and below each folding unit is a deflector 46 or 47 for directing the paper in the desired direction away from the folding unit. The deflector 47 below folding unit 30 is fixed to direct the folded sheet to the ejecting folds 48 and 49 of the stacking unit. The deflectors 46 at the first two folding units 10 and 20, in Fig. 1, are shiftable between the position shown in full lines and that shown in dotted lines. In the full line position the deflector guides the folded sheet toward the next folding unit, or, more specifically, onto the conveyor and turning table 3 or 4. When a deflector 46 is in the dotted line position it guides the folded sheet directly to the ejector rolls 48 and 49 which will then have been moved with the stacking unit 7 to the position shown in dotted lines adjacent the deflector 46 in question. It is evident, therefore, that the machine may be adjusted to eject the folded sheets immediately after they leave any one of the three folding units. In other words, if the sheet is to be folded only once, it may pass through the folder 10 and then immediately to the stacking unit 7. If it is to be folded twice, it may pass through the first two folders 10 and 20, and then immediately to the stacking unit 7.

The stacking unit

As previously noted, a sheet which has been completely folded is passed to the ejector rolls 48 and 49 by one of the deflectors 46 or 47. The rolls 48 and 49 feed the folded sheet under the resilient holding fingers 51 and onto the feed belts 52 which run along the delivery table 53. The belts 52 are driven by drive roll 54 and extend around idler roll 55, both of which are carried by the stacker frame 56, as are the ejector rolls 48 and 49. The belts 52 run over a belt tightening shaft 57, adjustably supported by arms 58 secured to the frame 56. The tightening shaft 57 carries an inverted U-shaped belt guide 59 for each belt. The belts may be positioned at any desired point laterally of the table 53 by loosening the set screw 60 and sliding the belt guide 59 to the desired position.

Figures 3, 4:
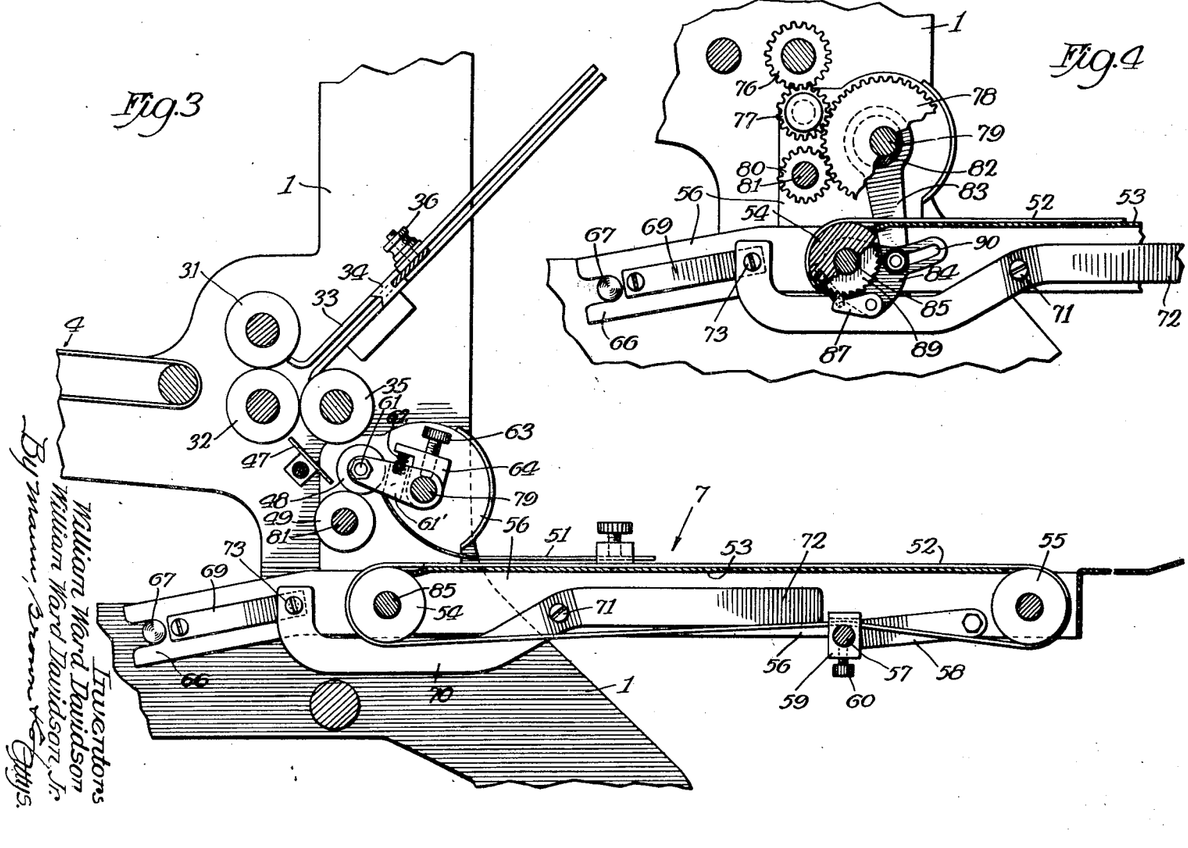
Fig. 3 is a fragmentary vertical sectional view on a larger scale showing the construction of the stacking unit and showing its attachment to the remainder of the folding machine, being taken approximately on the line 3—3 of Fig. 2 and some parts being omitted for the sake of clarity.
Fig. 4 is a fragmentary sectional view taken approximately on the line 4—4 of Fig. 2 and showing the driving mechanism for the stacking unit.

That which has heretofore been called the upper ejecting roll 48 is in reality a series of small pressure rollers each pivotally carried by a pin 61 in an arm 61', which is pivoted on a shaft 79 urged in a direction toward the ejecting roll 49 by a spring 62 (seen in Fig. 3). The tension of the spring may be adjusted by loosening a set screw 63 and rotating the block 64 on the shaft 79. The lateral position of the unit may be adjusted at the same time by sliding block 64 along shaft 79, arm 61' straddling block 64, and hence moving with it. The spring fingers 51 are each carried by a collar 65 carried on a split extension of pin 61, which may be expanded by a screw 65' to grip the collar 65 and hold the spring finger 51 in any desired position to exert a predetermined tension on the folded sheets passing thereunder.

Detachability of stacking unit

As previously noted, an important feature of the invention is the ability to place the stacking unit adjacent each of the folding units so as to receive the folded sheet directly therefrom if desired. The manner of attaching the stacking unit to the main frame 1 is seen best in Figs. 2, 3 and 5. The frame 56 is provided on each side with a bifurcated extension 66 which engages a pin 67 mounted on frame 1, as seen best in Fig. 2. The frame 56 also carries a pin 68 on each side adapted to extend into a suitable hole in the frame 1, as is also seen best in Fig. 2. Each pin 68 is urged into its engaging position by a leaf spring 69, and may be withdrawn therefrom by a releasing lever 70, which is rockably secured to the frame 56 by a screw 71. The lever 70 operates the pin 68 through a screw 73, which fits both the lever 70 and the spring 69 with sufficient play to prevent binding.

Figure 5:
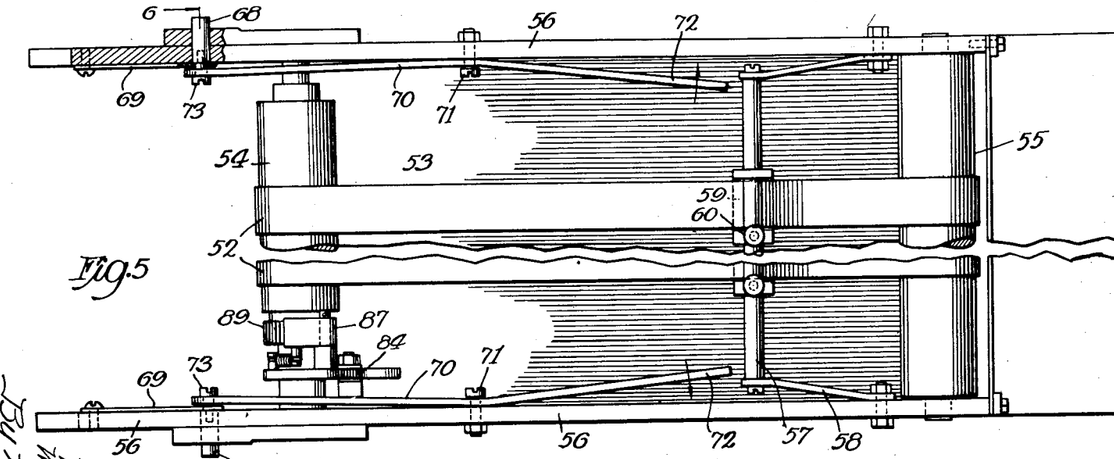
Fig. 5 is a fragmentary bottom view of the stacking unit.
Figures 6, 6A:
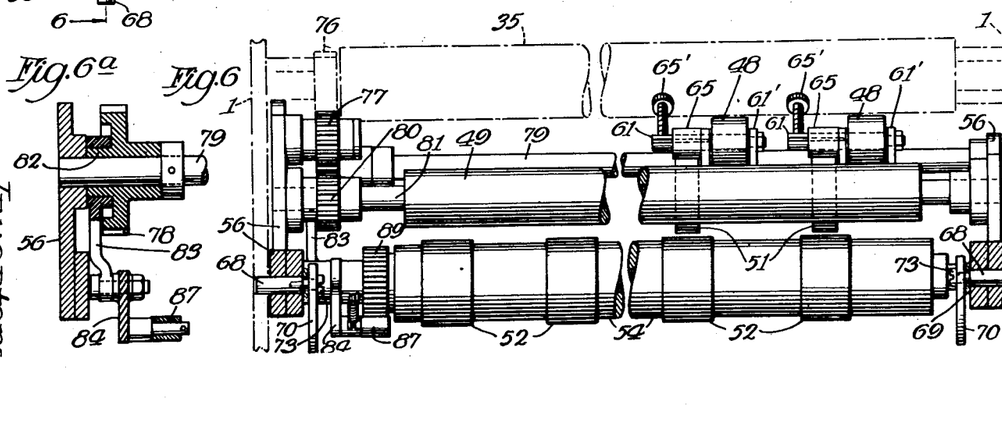
Fig. 6 is a transverse sectional view showing the receiving end of the stacking unit and taken approximately on the line 6—6 of Fig. 5.
Fig. 6a is a fragmentary sectional view taken on line 6a—6a of Fig. 4.

As is evident from Fig. 5, the actuation of the handles 72 of lever 70 in the direction of the arrows thereon will draw the pins 68 out from the frame 1, thus permitting the entire stacking unit to be slipped away from the frame 1 and the remainder of the folding machine, the bifurcated extensions 66 slipping freely away from the pins 67. In reinserting the stacking unit at another position it is merely necessary to slip the bifurcated extensions 66 onto the pins 67 at the other position, aline the pins 68 with the corresponding holes in the frame 1, and release the handles 72 to permit the springs 69 to press the pins 68 into these holes. The stacking unit is thus secured in place quite firmly.

*Drive for stacking unit*

It is desirable that the drive be such that it will be automatically connected and disconnected as the stacking unit is attached to and removed from the main frame. In connection with each of the folding units there is provided on the frame 1 a gear 76 (Fig. 4) which is driven in any suitable manner with the folding unit. In the case of the last folding unit 30 the gear 76 may be on the shaft of the folding roll 35; in the other folding units it may be on a scoring roll shaft. The detachable frame 56 carries an idler gear 77, which is positioned to mesh with the gear 76 when the stacking unit is in place. It will be observed that the gear 77 is somewhat under the gear 76, since the stacking unit will usually be shoved into engagement with pin 67 first and then swung upwardly about this pin to its final position. This upward swinging movement will bring the gear 77 into mesh with the gear 76. The gear 77 drives a gear 78, which may rotate on a shaft 79 carried by the frame 56. The gear 78 performs two functions, rotating the gear 80 fixed on the shaft 81 of the lower ejecting roll 49, and also turning an eccentric 82 which may be the hub of the gear 78.

The eccentric 82 reciprocates a follower link 83, which is pivoted to a segment 84 which is pivoted on the shaft 85 of the drive roll 54 for the belt 52. The segment 84 carries a pawl 87 which is urged by a suitable spring against a ratchet wheel 89, keyed to the shaft 85. It is thus seen that with every revolution of the gear 78 and its eccentric 82 the segment 84 is drawn upwardly and thrust downwardly. In its upward movement the pawl 87 rides over the teeth of the ratchet 89, but on its downward movement they engage the teeth and turn the ratchet 89, and hence drive the belts 52 a suitable distance in the forward direction. A suitable pawl might be provided, if desired, to prevent reverse movement of the ratchet wheel 89, but the friction will usually be great enough to make such a pawl unnecessary. From the foregoing it is seen that the gear 78 drives the ejecting roll 49 with a continuous movement, and drives the delivery belts 52 with an intermittent movement. This has the effect of stacking the folded leaflets in the well known overlapping manner.

The length of the stacker belt travel for each revolution of the shaft 79 can be adjusted by varying the distance between the shaft 85 and the pivotal connection between the arm 83 and segment 84, an elongated slot 90 being provided for this purpose.

*Conveying and turning tables*

If more than one fold is desired in the sheet the deflector 46 below scoring rolls 41 and 42 will be set as shown in full lines in Fig. 1 to guide the folded sheet onto the conveying and turning table 3 which will feed the sheet to the second folding unit, or more specifically, to the rolls 21 and 22 thereof. If it is desired that the fold formed by this second folding unit be at right angles to the first fold, this can be accomplished by turning the sheet through 90°. According to the present invention the turning of the sheet is accomplished by an improved form of table, construction of which is best seen from Figs. 1, 7, and 9 to 13. The table includes a table top 91 which may be supported from the frame 1 in any suitable manner as by brackets 92 and bar 94, seen best in Fig. 10. A feed belt 95 slides over table top 91, being driven by roll 96. The belt passes around an idler roll 97 at its lower end and may be tightened and positioned laterally of the table by tightener and guide 98 similar to the tightener 57—58—59 of Fig. 3.

The folded sheet is passed onto the belt 95 from the deflector 46 and is carried under a traction plate 101 which is positioned by bracket 102 sliding on bar 103 and bracket 104 sliding on bar 105. The strip is positioned directly over the belt 95 wherever the belt may be positioned by belt guide 98 and set screws 106 lock the strip in the desired position. The traction plate 101 may be provided with any means such as the marbles 107 for pressing the sheet against the belt 95 with relatively little friction, so as to insure the proper movement of the sheet by the belt.

Figures 10, 11, 11A, 12, 13:
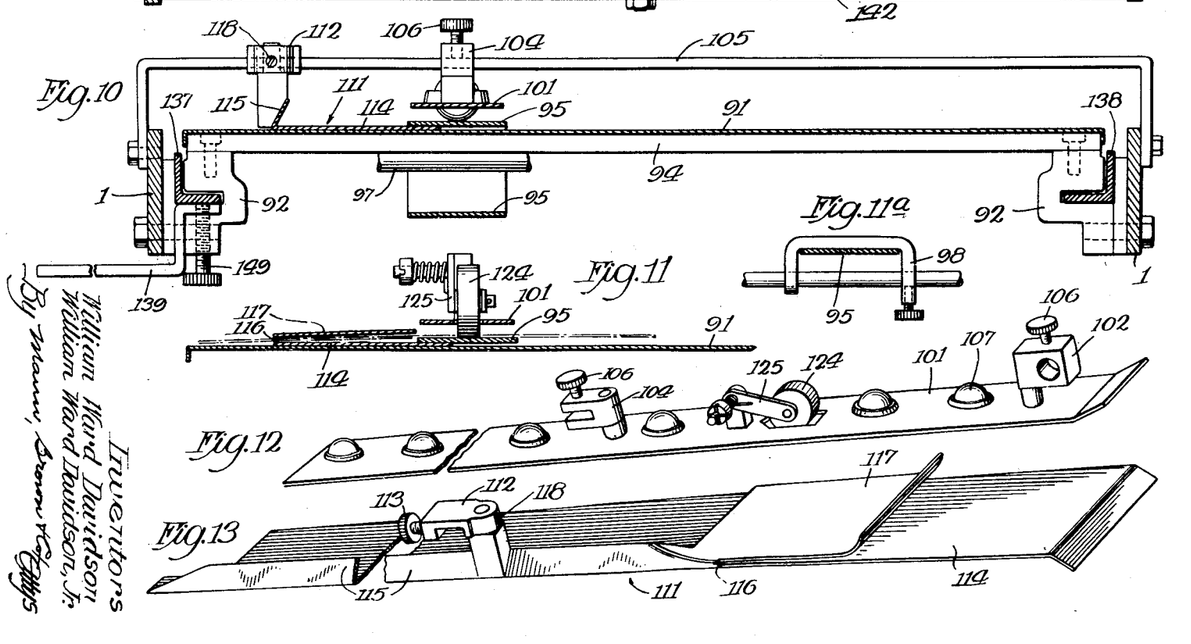
Fig. 10 is a similar view taken approximately on the line 10—10 of Figs. 1 and 7.
Fig. 11 is a fragmentary sectional view taken approximately on the line 11—11 of Figs. 1 and 7.
Fig. 11a is a fragmentary view showing the adjustable belt guide.
Fig. 12 is a perspective view of the pressure strip for pressing the paper against the conveyor belt to insure proper movement of the paper.
Fig. 13 is a similar view of the paper guide which the paper strikes and along which it slides.

Resting on the table top 91 and preferably extending under the belt 95 is a paper guide 111 seen in Fig. 13. This paper guide is positioned properly with respect to the belt 95 and traction plate 101 by a clamp 112 secured at any position on the bar 105 by a set screw 113. The paper guide 111 includes a bottom plate portion 114 on which the sheet slides and an edge guiding flange 115 along the inside of which the edge of the sheet slides after the sheet is turned. The edge guide 115 terminates in its upper end with a shoulder 116 forming a turning stop beyond which is an extension 117 which forms a guide over the sheet to insure that the sheet properly engages the shoulder 116. The angular position of the guide 111 may be adjusted by means of a small set screw 118 although once adjusted it normally will not require further attention.

Figure 7:
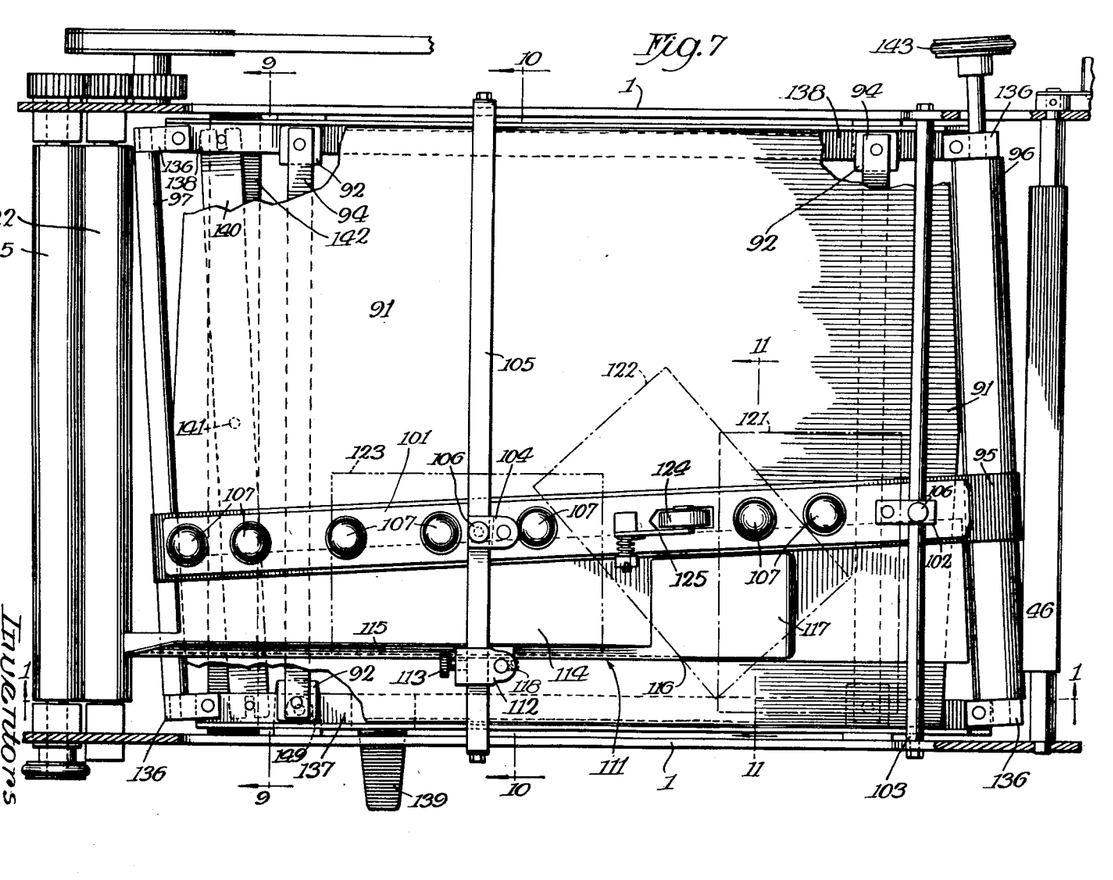
Fig. 7 is a fragmentary sectional view taken approximately on the line 7—7 of Fig. 1, showing the top of the turning table with a sheet of paper shown in dotted lines in three positions.

In Fig. 7 three positions of the paper sheet being turned are shown in dotted lines. At 121 the sheet has been dropped onto the belt 95 and is being moved forwardly by it toward the shoulder 116. At 122 the sheet has struck the shoulder 116 which stops one end of the sheet and the belt 95 has carried the other end of the sheet forwardly, thus turning the sheet. At 123 the belt has turned the sheet through 90° and has carried it beyond the shoulder 116. The lateral inclination of the belt 95 is now pressing the sheet against the edge guiding flange 115, thus insuring the accurate lateral position of the sheet and also insuring that it is turned to exactly 90°. To be sure that the sheet does not jam, and to assist it in turning, a pressure roller 124 supported from the traction plate 101 by spring urged arm 125 may be provided to press the paper firmly against the belt 95. Preferably the roller 124 is directly opposite the stop 116.

*Reversed turn*

Figure 8:
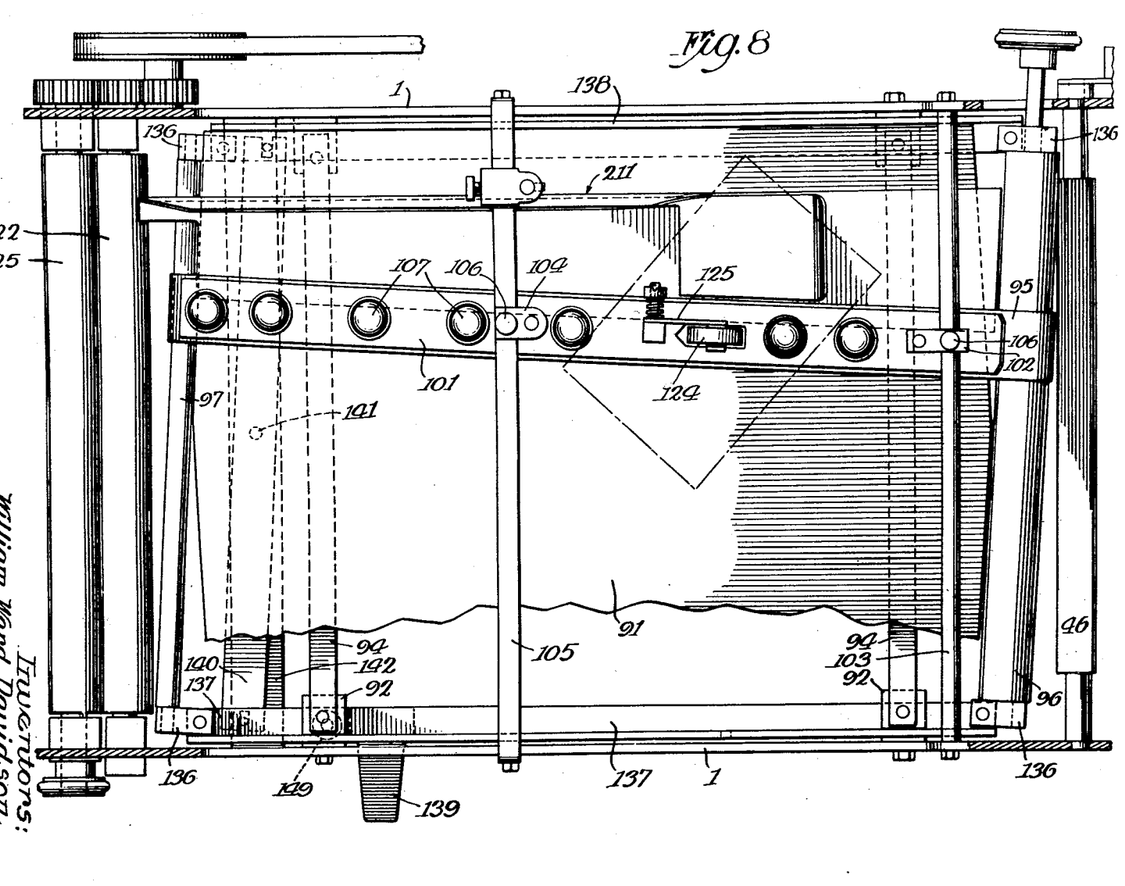
Fig. 8 is a view similar to Fig. 7 but showing the machine arranged for turning the paper in the opposite direction.
Figure 9:
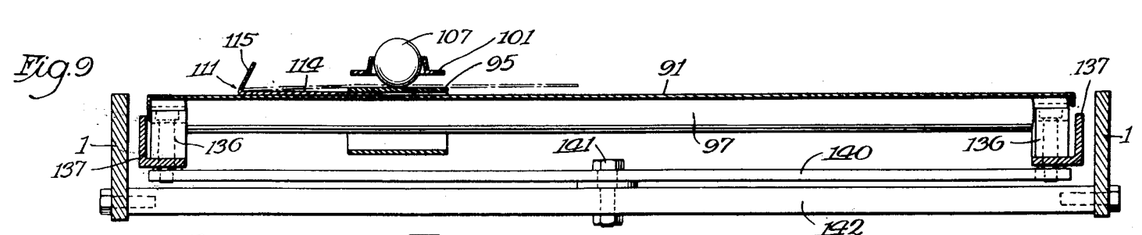
Fig. 9 is a transverse sectional view taken approximately on the line 9—9 of Figs. 1 and 7.

For some folding effects it is desirable to turn the sheet in the opposite direction from that illustrated in Fig. 7. This may be accomplished as seen in Fig. 8 by providing a paper guide 211 similar to the paper guide 111 but positioned on the opposite side of the machine and by changing the belt 95 and guide strip 101 to position them near and incline them toward the paper guide 211. The guide strip 101 may be shifted for this purpose by loosening the set screws 106. The belt 95 may be positioned laterally by sliding the belt guide 98 along on its supporting shaft as described in connection with the belt tightener 59.

In order to incline the belt 95 in the opposite direction, as shown in Fig. 8, it is necessary to reverse the angular position of the rolls 96 and 97 carrying this belt. To this end the rolls 96 and 97 are journaled in bearing blocks 136 which are pivoted to slide bars 137 and 138. As seen best in Fig. 10, the slide bars are supported by and slide with respect to bracket 92. A handle 139 may be rigidly secured to the slide bar 137 and extend outwardly from the frame 1 to facilitate shifting the slide bar 137. The slide bar 138 is operated in synchronism with the slide bar 137 by means of a lever 140 pivoted by a pin 141 to the cross bar 142 of the frame 1 so that when the slide bar 137 is moved in one direction the slide bar 138 is automatically moved in the opposite direction. Any suitable means may be provided for securing the slide bars 137 and 138 in the adjusted position as, for example, the set screw 149 which is threaded through the bracket 92 adjacent the handle 139, and which, when advanced upwardly, bears against the slide bar 137. The belt 143 should, of course, be driven from a position equidistant from the two positions of the pulley on roll 96 to permit the reversing of the angularity of the rolls 96 and 97 as already described, and so that the belt will be tight in both positions.

The lower feed table 4 is substantially the same as the feed table 3 already described except that the turning means is not adaptable to both sides of the table to make right or left turns, but to the extent that the parts are the same, or similar, like number have been used.

FOUR-UNIT FOLDER

The four unit folder shown in Figs. 14–18 has unusual flexibility in performance, for it is capable of making any combination of three parallel and/or right angle folds, an accomplishment which has heretofore required the use of additional folding units, usually nine in all. The machine shown in Figs. 14–18 inclusive, in addition to being provided with an automatic feed, differs from the three unit folder shown in Figs. 1–13 inclusive principally by having the lower feed table 4 equipped to turn the sheet being conveyed along that table optionally to the right, or to the left, and by providing an additional parallel folding unit 200 at the delivery end of the table. This change in structure, though relatively slight, has far reaching effects in determining the variety of folds which the machine is capable of making.

Since the feed table 4 is an exact duplicate of the feed table 3 (except it is turned end for end with respect to the upper table) it is unnecessary to again specifically describe the details of the table or the turning mechanism. It will be understood that as the sheet being folded is delivered from the folder 20 to the table 4, it can be turned to the right or to the left to present the desired edge of the sheet to the subsequent folding unit.

Figures 16, 17, 18:
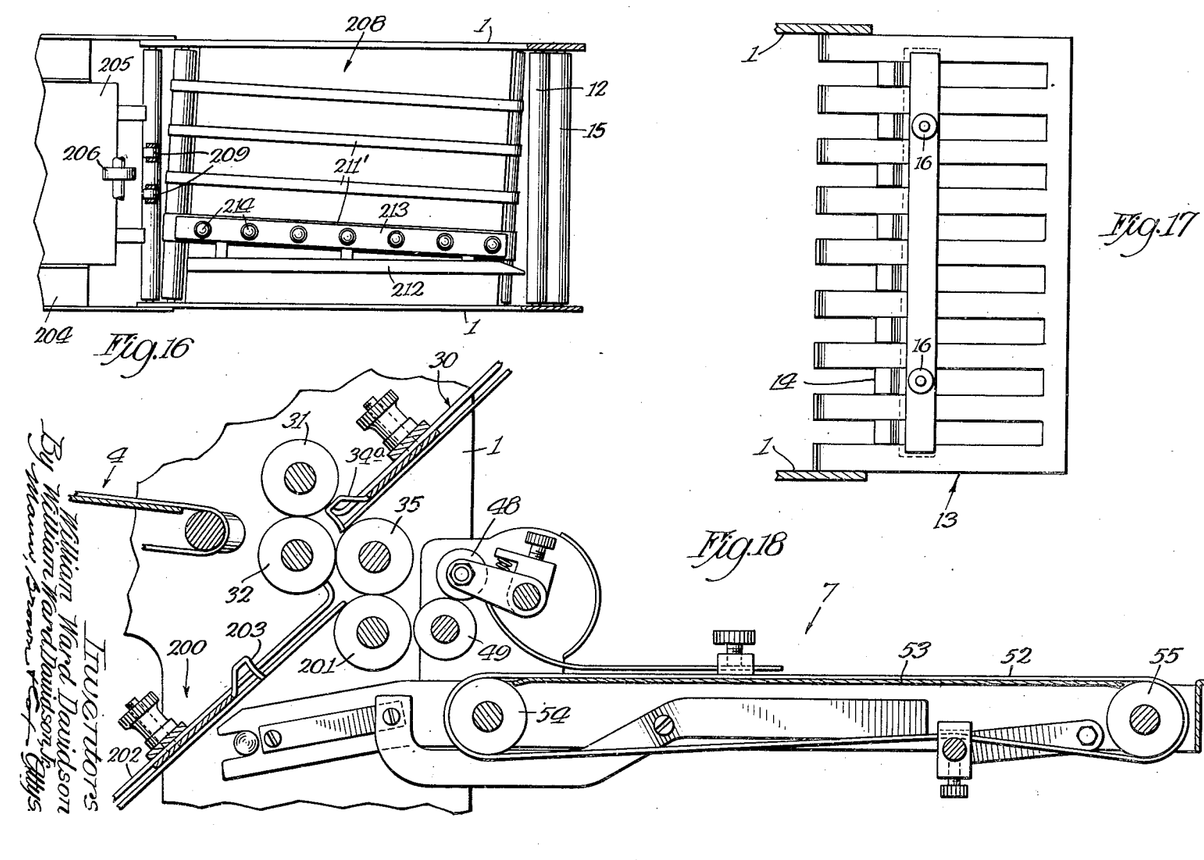
Fig. 16 is a plan view of the automatic feeder associated with the folding machine.
Fig. 17 is a plan view of one of the buckle chutes.
Fig. 18 is a view showing the mounting of the stacker to receive folded sheets from either the third or the fourth folding units.

The folding unit 200 includes the rolls 32 and 35 associated with the folder 30 and an additional roller 201 arranged in the usual relationship for cooperation with the buckle chute 202 of the fourth folding unit 200. As well understood, a sheet passing between the rolls 32 and 35 is fed into the buckle chute 202 until it strikes the stop 203 whereupon the sheet is buckled through the rolls 35 and 201 to produce the fourth fold. The sheet is then delivered to the ejector rolls 48 and 49 associated with the stacker, and the signatures are piled on the stacker in the usual manner. The stops 14a, 24a and 34a in Fig. 14, which are associated with the folding units 10, 20 and 30, respectively, are of slightly different form than the corresponding stops in the three-unit folder shown in Figs. 1–13 inclusive. They are designed with a relatively broad face 215 so that when the stop is adjusted to deflect a sheet past the chute with which the stop is associated (as shown in Fig. 18, see folder unit 30), there is no opportunity for the sheet to become jammed by striking an edge of the chute. The stops 14, 24 and 34 are also capable of deflecting the sheet when moved to a position adjacent the mouth of each shoe, but the stops 14a, 24a and 34a are preferred because of their broad faces 215.

Figure 14:
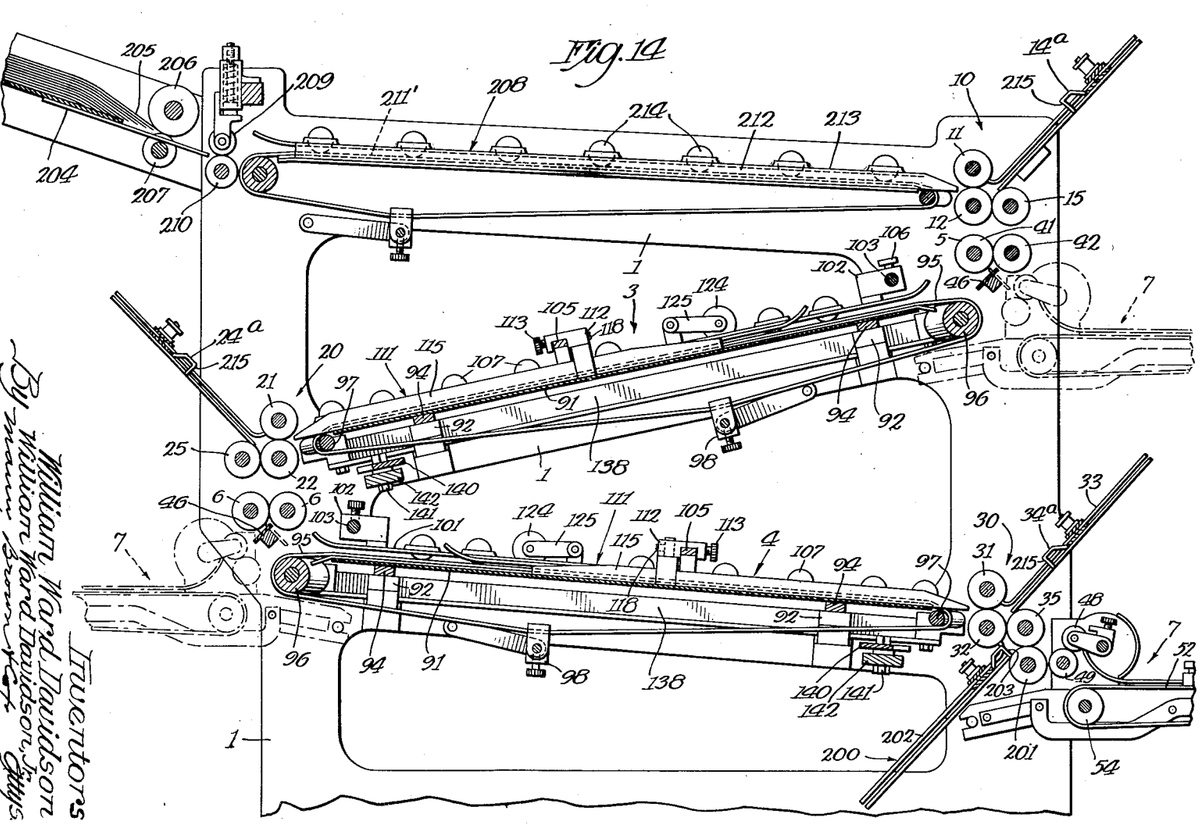
Fig. 14 is a side elevational view showing a folding machine having four folding units arranged in parallel which, because of their relationship to the associated sheet conveying and turning tables, are capable of producing any combination of three parallel and/or right angle folds.
Figure 15:
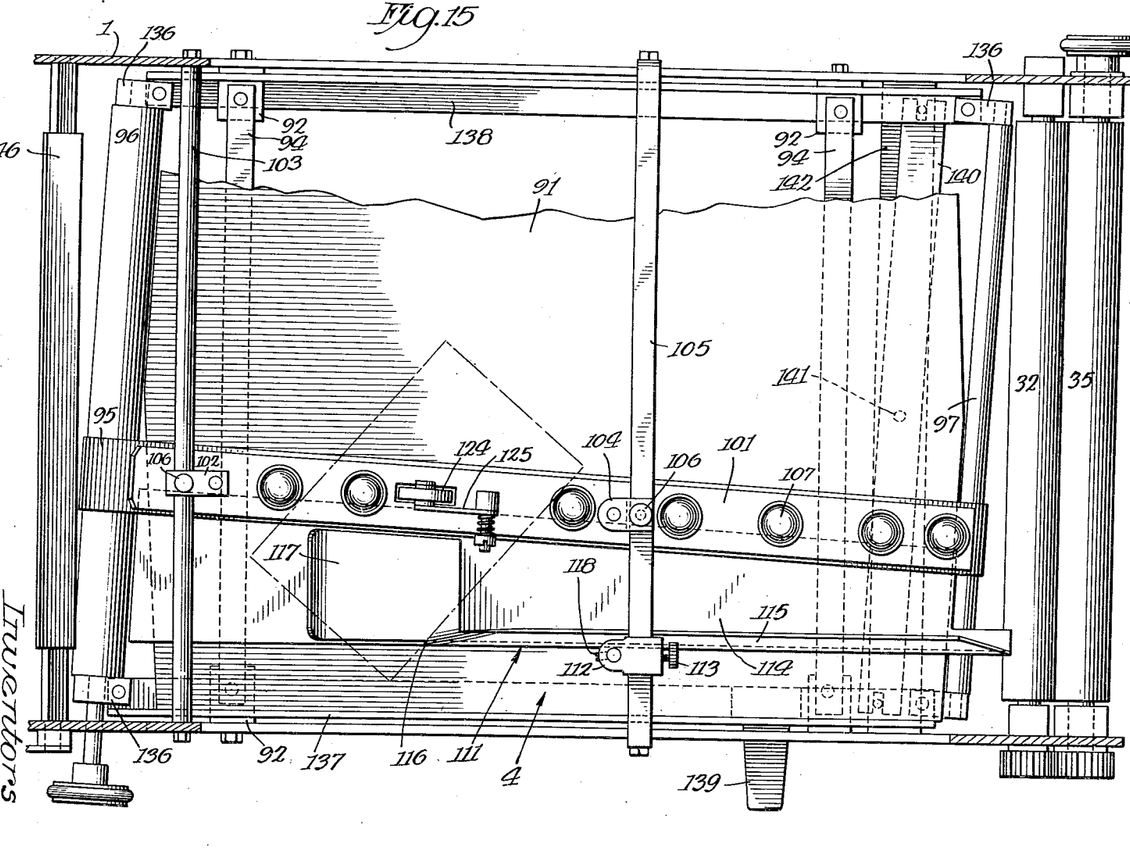
Fig. 15 is a plan view looking down upon the lower sheet conveying and turning table.

The stop 34a associated with the buckle chute 33 and the stop 203 associated with the buckle chute 202 may be adjusted to act as deflectors when it is desirable to deflect the sheet past either one or the other of the chutes. In other words, for certain folds, the stop 34 may be adjusted so that a sheet coming from the table 4 will be deflected past the chute 33 and into the chute 202 to have the third fold made between the rollers 35 and 201 (see Fig. 18), or the sheet may be fed into the chute 33, folded between the rolls 32 and 35, and then deflected past the chute 202, as shown in Fig. 14.

An automatic feeder has been shown in Figs. 14–18 inclusive, and it is obvious that it could be used with equal advantage with the three unit folder shown in Figs. 1–13 inclusive. The feeder comprises a feed board, generally designated 204, upon which the sheets to be folded are placed in horizontal position with the edges fanned out, as indicated at 205. The sheets are pulled from the pile one at a time, by action of feed rolls 206 and 207, the former being constantly driven to deliver sheets to pull out rolls 209 and 210 and then to the feed table, generally designated 208, in more or less spaced relationship.

The feed table 208 comprises a series of conveyor belts 211' (Figs. 14 and 16) which are biased toward a side guide 212, and the belt closest to the guide is equipped with a traction device 213 consisting of a frame carrying loosely mounted marbles 214 which rest upon the belt. Guide 212, belts 211' and traction device 213 are adjustable laterally so that the sheet may be delivered to the folding unit 10 in a predetermined lateral position with respect to the table. The feed table with its biased conveyor belts and associated side guide assures accuracy for the first fold.

OPERATION OF THREE-UNIT FOLDER (FIGS. 1–13 INCLUSIVE)

When a flat sheet is fed along the table 2 to rolls 11 and 12, these rolls feed the sheet into buckle chute 13 until it strikes the paper stop 14, after which the sheet buckles and is caught between folding rolls 12 and 15 which feed the folded sheet between the scoring rolls 41 and 42. If there is to be no subsequent folding, the scoring rolls 5 may be separated so as not to score paper, and the deflector 46 at folding unit 10 is swung to the dotted line position shown in Fig. 1 to cause the sheet to be ejected at this point. In this event, the stacking unit shown in Fig. 3 will be positioned to receive the sheet from this deflector 46 as indicated by the dotted lines adjacent deflector 46 in Fig. 1. It is thus seen that the sheet is removed from the machine immediately after its folding is complete so that there is no chance for the machine to become jammed as the sheet passes subsequent folding units, and no need to make adjustments in the rest of the machine. If the sheet is to be further folded, the deflector 46 below folding unit 10 is set in the position shown in full lines and the sheet passes onto the belt 95 which carries it along under the guide strip 101 and the guide extension 117.

If the next fold is to be at right angles to the preceding fold, one end portion of the paper strikes the roller 124 and shoulder 116 which stop this end of the paper, causing the paper to be rotated through 90° as it is carried on by the belt 95, against which the paper is pressed firmly by the roller 124. After the sheet has been turned it is properly lined up for the next operation by being pressed against the edge guiding flange 115 due to the lateral inclination of the belt 95 in that direction. If the second fold is to be parallel to the first fold, the sheet is not turned on the table 3. Turning may be avoided by replacing the sheet guide 111 with a plain sheet guide which does not have a roller 124 or stop 116, but instead has the edge guide 115 extending the length of the table 3. If the sheet guide 111 is retained, the roller 124 may be swung to an inactive position and the machine may be adjusted to cause the paper to strike the edge guide 115 after it has passed, without striking, the stop 116. It will be understood, of course, that the feed table 2 will have an edge guide or jogger for determining the lateral position at which the sheet starts through the folding unit 10 and hence its initial lateral position on the table 3.

The belt 95 now feeds the paper to the folder rolls 21 and 22 of folding unit 20, by which the sheet is fed into chute 23 until it strikes the paper stop 24, at which time it buckles and is caught between rolls 22 and 25. From these, it is fed between the scoring rolls 6 which are separated so as not to score unless there is to be further folding. If there is no further folding, the deflector 46 below folding unit 20 is set to the position shown in dotted lines in Fig. 1 for ejecting the completely folded paper at this point, the ejector shown in Fig. 3 having been moved to the position shown in dotted lines below the folding unit 20. Thus, if both folding units 10 and 20 are necessary to complete the folding of the sheet but not unit 30, the folded sheet is ejected from the machine immediately after passing through the unit 20, so that it need not pass through the unit 30.

If, however, the unit 30 is also needed, the deflector 46 associated with folding unit 20 is set to the position shown in full lines in Fig. 1 and feeds the sheet to the feeding table 4 which carries it to the folding unit 30, turning it or not as may be required. The folding unit 30 makes the final fold in the sheet in the manner already described, after which the fixed deflector 47 directs the sheet to the ejecting rolls 48 and 49 of the stacking unit, which pass the folded sheet onto the intermittently moving belts 52 to stack the completely folded sheets in overlapping relationship in a conventional way.

OPERATION OF THE FOUR-UNIT FOLDER (FIGS. 14-18 INCLUSIVE)

The operation of the four unit folder shown in Figs. 14-18 inclusive is the same as the three-unit folder with the exception of the action of the table 4 and the two subsequent folding units 30 and 200.

A twice-folded sheet which is delivered to the table 4 from the folding unit 20 may be turned to the right or to the left depending upon the side upon which the guide 111 with its turning stop is placed (it being understood that the conveying belt 95 is always biased in a direction to drive the sheet into the guide) and after being turned, the sheet may receive a third fold by entering the chute 33 and being folded between the rolls 32 and 35, or it may be deflected past the chute 33 into the chute 202 to be folded by the rolls 35 and 201, or it may enter both chutes in succession to produce the third fold between the rolls 32 and 35 and the fourth fold between the rolls 35 and 201.

Figure 19:
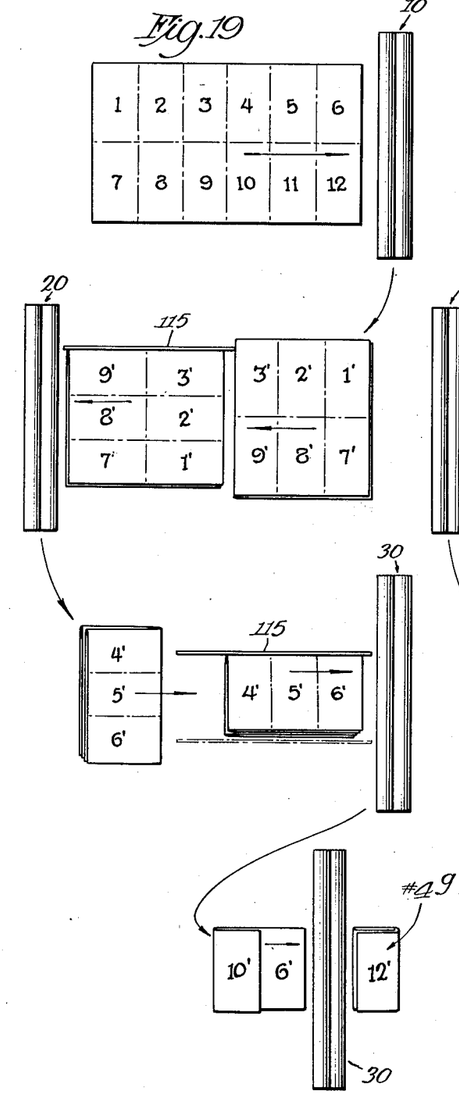
Figs. 19, 20 and 21 are diagrammatic views which illustrate the versatility of the machine.
Figure 20:
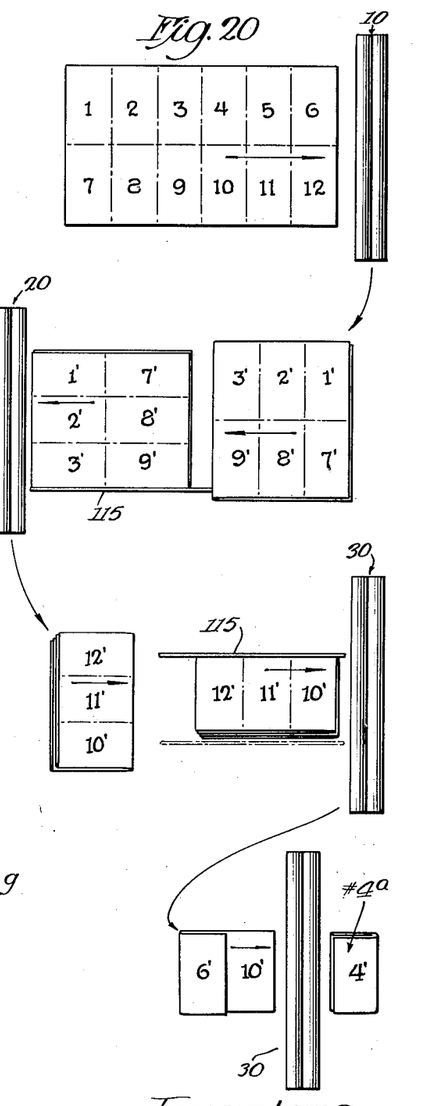
Figure 21:
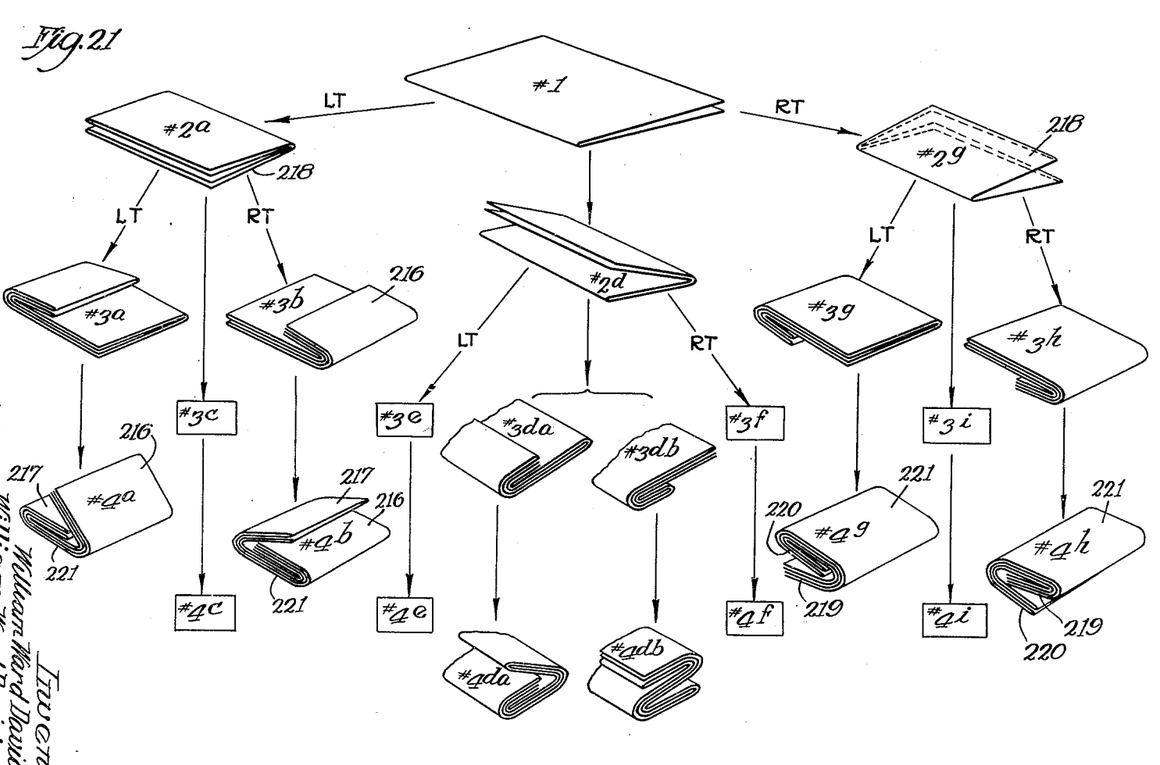

The effect which the direction of the turn on the conveyor table 3 has upon the third and fourth folding units may best be explained by referring to Figs. 19, 20 and 21, and comparing the relative versatility of the three and four unit folders.

COMPARATIVE PERFORMANCE OF THREE AND FOUR UNIT FOLDERS (FIGS. 19-21 INCLUSIVE)

The statement has been made that the four-unit folder shown in Figs. 14-18 inclusive is capable of making any combination whatsoever of three parallel and/or right angle folds, and the truth of this statement is partially illustrated in Fig. 21. Of course, it should be understood that it is impractical to show all combinations of three parallel and/or right angle folds, but the point can be illustrated by demonstrating how the four unit folder can produce four specific types of quadruple folds.

Let us consider first a quadruple fold which is made by first producing a single fold in the sheet, then a right angle fold, then a second right angle fold, and last a fourth fold parallel to the third fold, the two latter folds dividing the twice folded sheet into thirds. If the machine has complete flexibility, this fold should be able to be made with the center panel of the twice folded sheet either in or out and with heads in or heads out in either direction.

That this can be accomplished is best shown in Fig. 21. The single folded sheet designated No. 1, coming from the first folding unit 10, makes a left turn on table 3 and then enters the second folding unit 20 to produce fold designated No. 2a. If a left turn is made on table 4 and the sheet is then permitted to go two-thirds of its length into the third folding unit, fold No. 3a is produced, and if the thrice folded sheet is permitted to go for half of its length into the fourth folding unit 200, fold No. 4a is produced.

Consider now what would happen if the turn on table 4 had been to the right instead of to the left, with the setting for the third and fourth folding units the same as before. In such a case, the flap 216 would be folded in the third folding unit, as shown in 3b, and the flap 217 would then be folded, as shown in 4b.

Obviously, the only difference between folds 4a and 4b is that in 4a, the flap 217 is under the flap 216, while in fold 4b, the flap 217 is over the flap 216. In other words, folds 4a and 4b illustrate a quadruple fold in one direction, heads in or heads out.

Now let us suppose that the turn on table 3 had been to the right instead of to the left, and though the resultant fold 2g is exactly the same as fold 2a, the twice folded sheet is presented to table 4 with face 218 up instead of down, as was the case when the turn on table 3 was to the left.

Now with a left turn on table 4 and the same setting of the stops in the third and fourth folding units as before, the third folding unit will produce fold No. 3g and the fourth folding unit will produce fold No. 4g in which flap 219 is on the outside of flap 220.

A right turn on table 4 with two subsequent folds would produce folds No. 3h and 4h in which the flap 219 is inside of flap 220.

In other words, folds 4g and 4h represent a quadruple fold, heads in or heads out in the opposite direction from the center panel 221 as the folds 4a and 4b, respectively.

The interesting thing to note is that it was the direction of turning used on table No. 3 which determined in which direction the third and fourth folds were made with respect to the center panel 221.

Other varieties of folds are indicated in Fig. 21. For example, if the turning mechanism on table 4 is not used, fold 2a may be given a third fold parallel to the second fold, as indicated at 3c and a fourth fold parallel to the third fold, as indicated at 4c. Similarly, fold 2g may progress into two subsequent parallel folds 3i and 4i. Also if the turning mechanism on table 3 is not employed, fold 2d may be made and left turn on table 4 will then produce fold 3e on the third folding unit, and fold 4e in the fourth folding unit, or if the turn is to the right on table 4, folds 3f and 4f may be made in the third and fourth folding units, respectively.

If the turning mechanism associated with both of the tables 3 and 4 are rendered inoperative by suitable adjustment, four parallel folds may be made. When the third folding unit permits the twice folded sheet to go two-thirds of its length into the buckle chute and the fourth folding unit permits the thrice folded sheet thus formed to go one-half of its length into the buckle chute associated with that folder, folds No. 3da and 4da, respectively, are made. If, on the other hand, the stop associated with the buckle chute of the third folding unit is adjusted so that only one-third of the twice folded sheet enters the buckle chute and the fourth folding unit is left with the same adjustment as before, folds No. 3db and 4db, respectively, are made.

It should be understood that for the sake of clarity, the various folds shown in Fig. 21 have been viewed from angles which facilitate their illustration, rather than being shown in the positions from which they emerge from any particular folding units.

A more exact representation of the path which a sheet takes in being folded to form folds 4g and 4a is shown in Figs. 19 and 20, respectively, in which the individual panels on one side of the sheet have been numbered consecutively from 1–12, and the corresponding panels on the other side of the sheet have been numbered consecutively from 1' to 12'.

It is obvious that the three-unit folder of Figs. 1–13 cannot make any of the No. 4 folds shown in Fig. 21 of which there are many (not all have been shown in Fig. 21, of course) nor any of the folds resulting from a left turn on table 4, as for example, folds 3a, 3e, or 3g, 4a, 4e or 4g.

ADDITIONAL FOLDING UNITS

Although the folding units 10 and 20 have in each instance been illustrated as only a single folding unit, it should be understood that additional folding units may be provided at these positions if desired. Preferably wherever a multiple folding unit is used, the arrangement should be that the sheet may be optionally deflected by any one or more of the multiple folding units.

Another extremely useful form of a three folder unit may be made by what in effect amounts to removing the upper portion of the machine shown in Fig. 14 making the folding unit 20 the first folding unit and converting the conveyor board 3 into a feed table. It will be found that a great variety of triple folds can be made with a machine so constructed.

The statement in the appended claims to the effect that portions of the diagonally-moving sheet engaging means are spaced a substantial distance away from the side guide in order that sheets initially widely spaced from the side guide will be urged throughout substantially their entire length by said diagonally-moving means toward said guide and into registry therewith, is intended to mean that said portions of the diagonally-moving sheet engaging means are spaced from the side guide a sufficient distance so that taking into consideration the range of error within which sheets may be fed to the conveyor, or the range of error within which a 90° turn may be made, the diagonally-moving sheet engaging means will dependably move the sheets laterally into engagement and registry with the side guide.

We claim:

1. A folding machine comprising a series of four folding units adapted to act upon a sheet to fold it into any one of a wide variety of three parallel and/or right angle folds, said machine including means interposed between the first and second folding units for conveying the sheet without turning it, or turning the sheet through an angle of 90° in either direction said means including a side guide and a conveyor having diagonally-moving sheet engaging means, portions of which are disposed longitudinally of the conveyor and are spaced a substantial distance away from the side guide whereby sheets initially widely spaced from the side guide will be urged throughout substantially their entire length by said diagonally-moving means toward said guide means and into registry therewith, and means interposed between the second and third folding units for turning the sheet in at least one direction through an angle of 90°, and means for optionally deflecting the sheet past one or the other of the third and fourth units, said third and fourth folding units being arranged so that one is capable of folding the sheet forwardly and the other is capable of folding the sheet rearwardly.

2. A folding machine comprising a series of four folding units adapted to act upon a sheet to fold it into any one of a wide variety of three parallel and/or right angle folds, said machine including means interposed between the first and second folding units for conveying the sheet without turning it, or turning the sheet through an angle of 90° in either direction said means including a side guide and a conveyor having diagonally-moving sheet engaging means, portions of which are disposed longitudinally of the conveyor and are spaced a substantial distance away from the side guide whereby sheets initially widely spaced from the side guide will be urged throughout substantially their entire length by said diagonally-moving means toward said guide means and into registry therewith, and means interposed between the second and third folding units for turning the sheet in at least one direction through an angle of 90°, and means for optionally deflecting the sheet past one or the other of the third and fourth units, all of said four folding units being arranged in parallel, said third and fourth folding units being arranged so that one is capable of folding the sheet forwardly and the other is capable of folding the sheet rearwardly.

3. In a folding machine, four folding units arranged to act in sequence on a sheet of paper or the like, to produce any combination of three parallel and/or right angle folds, including a folded sheet having a first fold, a second fold at right angles to the first fold, a third fold at right angles to the second fold, and a fourth fold parallel to the third fold and in which the third and fourth folds may be in either direction with respect to the center panel of the folded sheet, and in each direction, folding sheets either heads in or heads out, said machine comprising first, second, third and fourth folding units all parallel to each other, conveyor and turning means between the first and second units and between the second and third units for turning the folded sheet through an angle of 90° selectively in either of two directions, said conveyor and turning means including a side guide and a conveyor having diagonally-moving sheet engaging means, portions of which are disposed longitudinally of the conveyor and are spaced a substantial distance away from the side guide whereby sheets initially widely spaced from the side guide will be urged throughout substantially their entire length by said diagonally-moving means toward said guide and into registry therewith, and means for optionally deflecting the sheet past one or the other of the third and fourth units, said third and fourth units being arranged so that one is capable of folding the sheet forwardly and the other is capable of folding the sheet rearwardly.

4. A folding machine comprising a series of four folding units adapted to act upon a sheet to fold it with any desired combination of three parallel and/or right angle folds, said machine including means interposed between the first and second folding units for conveying the sheet without turning it, or turning the sheet through an angle of 90° in either direction, and means interposed between the second and third folding units for turning the sheet in at least one direction through an angle of 90°, and means for producing an additional fold in either of two directions by selectively employing one or the other of the third and fourth folding units, or producing two additional folds by successively employing the third and fourth folding units, said third and fourth units being arranged so that one is capable of folding the sheet forwardly and the other is capable of folding the sheet rearwardly.

5. A folding machine having four folding units, sheet turning means intermediate the first and last units, said units and means being constructed and arranged so that they are capable in and of themselves to produce any combination of three parallel and/or right angle folds.

6. A folding machine having four parallel folding units, sheet turning means intermediate the first and last units, said units and means being constructed and arranged so that they are capable in and of themselves to produce any combination of three parallel and/or right angle folds.

7. In a folding machine, a plurality of folding units, less than nine in number, sheet turning means intermediate the first and last units, said units and means being constructed and arranged so that they are capable in and of themselves to produce any combination of three parallel and/or right angle folds.

8. In a folding machine, a plurality of folding units and a sheet turning means intermediate the first and last units, said units and means being constructed and arranged so that they are capable in and of themselves to produce any combination of three parallel and/or right angle folds, all of said folding units for producing said folds being parallel to each other.

9. In a machine of the class described, a series of folding units including a first folding unit, second and third folding units arranged so that one is capable of folding the sheet forwardly and the other is capable of folding the sheet rearwardly, means for optionally deflecting the sheet past one or the other of the second and third folding units, and conveyor and turning means interposed between the first and second folding units for conveying the sheet to the second folding unit without turning it, or turning the sheet through an angle of 90° in either direction, said conveyor and turning means including a side guide and a conveyor having diagonally-moving sheet engaging means, portions of which are disposed longitudinally of the conveyor and are spaced a substantial distance away from the side guide whereby sheets initially widely spaced from the side guide will be urged throughout substantially their entire length by said diagonally-moving means toward said guide and into registry therewith.

10. A folding machine including a series of parallel folding units and a plurality of driven parallel conveyors, one above another, each of said conveyors being capable of turning a sheet or conveying it without turning and extending downwardly from one folding unit to the next whereby the movement of the sheet is aided by gravity, and whereby folding units which are in vertical alinement are substantially spaced apart, one of the conveyors in advance of the last conveyor being capable of turning the sheets in either direction at will.

WILLIAM WARD DAVIDSON.
WILLIAM WARD DAVIDSON, Jr.